(12) United States Patent
Cherubini et al.

(10) Patent No.: US 6,665,349 B1
(45) Date of Patent: Dec. 16, 2003

(54) FILTERED MULTITONE TRANSMISSION APPLICATION TO DSL TECHNOLOGIES

(75) Inventors: Giovanni Cherubini, Rueschlikon (CH); Evangelos S Eleftheriou, Zurich (CH); Sedat Oelcer, Au (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,564

(22) Filed: Jan. 6, 2000

Related U.S. Application Data

(60) Provisional application No. 60/115,370, filed on Jan. 11, 1999.

(51) Int. Cl.[7] .............................. H04L 23/02; H04L 5/12
(52) U.S. Cl. ........................................ 375/261; 375/219
(58) Field of Search ................................ 375/345, 222, 375/260, 261; 370/307, 203, 210

(56) References Cited

PUBLICATIONS

Sandberg et al. "Overlapped Discrete Multitone Modulation for High Speed Copper Wire Communications," IEEE J. Select. Areas Commun., vol. 13, pp 1571–1585, Dec. 1995.*

* cited by examiner

Primary Examiner—Stephen Chin
Assistant Examiner—Curtis Odom
(74) Attorney, Agent, or Firm—Thomas A. Beck; Louis P. Herzberg

(57) ABSTRACT

Transmission techniques suitable for use in digital subscriber line (DSL) systems such as very high rate digital subscriber line (VDSL) systems are described. One embodiment of the present invention describes a transmission technique related to OFDM from high-speed transmission over twisted-pair cables. The scheme, also known as filtered multitone modulation (FMT), exhibits significantly lower spectral overlapping between adjacent subchannels and provides higher transmission efficiency than discrete multitone modulation (DMT).

44 Claims, 10 Drawing Sheets

FILTERED MULTITONE TRANSMISSION APPLICATION TO DSL TECHNOLOGIES

PRIORITY

This application claims priority from Provisional Application bearing Ser. No. 60/115,370, filed Jan. 11, 1999.

CROSS REFERENCES

The present application is related to the following applications even dated herewith: Ser. No. 09/478,563, entitled "Communications Network System" to Cherubini, et al.; and Ser. No. 09/478,565, entitled "Hybrid TDMA/CDMA System Based on Filtered Multitone Modulation" to Cherubini, both of which applications are incorporated by reference herein.

TECHNICAL FIELD

The invention concerns transmission techniques which are suited for use in digital subscriber line (DSL) systems, and in particular very-high-rate digital subscriber line (VDSL) systems.

BACKGROUND OF THE INVENTION

Herein considered are transmission techniques for VDSL, an emerging network-access technology over telephone copper cables that can be viewed as an evolution of the asymmetric digital subscriber line (ADSL). [See: G. T. Hawley, "Systems Considerations for the Use of xDSL Technology for Data Access," IEEE Commun. Mag., vol. 35, pp. 56–61, March 1997.]

ADSL was developed in the early 1990s to enable interactive video-on-demand service over the same twisted-pair used for analog telephony. The asymmetry in the transmission rates results from the fact that the delivery of compressed digital video signals in the downstream direction requires a much larger capacity than the transmission of the return signal in the upstream direction. According to the ADSL standard approved by the American National Standards Institute (ANSI) in 1995, downstream rates up to 6.176 Mbit/s and upstream rates up to 640 kbit/s are considered. Details of the ADSL standard are given in the reference "Network and Customer Installation Interfaces—Asymmetric Digital Subscriber Line (ADSL) Metallic Interface," ANSI T1E1.413-1995, August 1995.

The reference by M. Cioffi, "Asymmetric Digital Subscriber Lines," in The Communications Handbook, ed. J. D. Gibson, ch. 34, pp. 450–479, CRC Press, 1997 is a tutorial on ADSL which is incorporated by reference in its entirety. More recently, the rapid expansion of Internet services and the potential interest of subscribers in services such as teleconferencing and telecommuting have motivated ANSI and the European Telecommunications Standards Institute (ETSI) to start work on VDSL, where rates up to 52 Mbit/s in the two directions of transmission are envisaged.

The version of orthogonal frequency division multiplexing (OFDM) known as discrete multitone (DMT) modulation was chosen by ANSI as a standard for ADSL transmission; see, J. A. C. Bingham, "Multicarrier Modulation for Data Transmission: An Idea Whose Time Has Come" IEEE Commun. Mag., vol. 28, pp. 5–14, May 1990, and J. S. Chow, J. C. Tu, and J. M. Cioffi, "A Discrete Multitone Transceiver System for HDSL Applications," IEEE J. Select. Areas Commun., vol. 9, pp. 895–908, August 1991. The references to Bingham and Chow, et al. supra, are incorporated by reference in their entirety. In general, OFDM systems employ M orthogonal subcarriers for parallel transmission of blocks of M symbols over M subchannels. The chosen DMT system is well suited for ADSL transmission over telephone copper cables, because it allows more flexibility in capacity allocation and provides higher robustness in the presence of impulse noise than other passband techniques, e.g., carrierless amplitude and phase (CAP) modulation. The design of a VDSL transceiver, however, is more difficult than the design of an ADSL transceiver, because of the high rates considered. Echo and alien near-end crosstalk (NEXT) signals are the predominant interferences for VDSL transmission. Alien NEXT represents a problem mainly for upstream transmission, because twisted pairs are usually bundled in the same multipair UTP cable at the central office.

SUMMARY OF THE INVENTION

A new transmission technique related to OFDM is herein proposed for high-speed transmission over twisted-pair cables. The scheme, which is herein called "filtered multitone modulation" (FMT), exhibits significantly lower spectral overlapping between adjacent subchannels and provides higher transmission efficiency than DMT.

Multitone modulation with a high level of subchannel spectral containment are mentioned in European Patent application bearing the title "Communication Network System", G. Cherubini and G. Ungerboeck, filed on the same day as the present application and currently assigned to the assignee of the present application and also in an article by J. Karaoguz, J. Yu, V. Eyuboglu, "Comparison of Single-Carrier, Multi-Carrier, and Spread Spectrum Modulation for Upstream PHY Layer in HFC CATV Networks," IEEE 802.14 contribution 98-018, July 1998. The references mentioned immediately above are incorporated by reference in their entirety. In the aforementioned Karaoguz, et al. reference, the filters are ideal unrealizable square-root raised cosine filters with zero roll-off. There is further proposed, methods of echo cancellation for FMT modulation, which allow full-duplex VDSL transmission over the entire bandwidth.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

The basic concept and implementations of the of the preferred embodiments of the present invention are described as follows.

FMT Modulation with Application to FDD for DSL Technologies

Both DMT-based time-division duplexing (TDD) and DMT-based frequency-division duplexing (FDD) have been proposed to achieve the capacity required for VDSL transmission links. With the TDD technique, downstream and upstream transmissions alternate in time using the entire bandwidth. Echo does not represent a problem in principle, because this signal is present at the receiver input only when transmission takes place in the opposite direction. Similarly, alien NEXT interference is avoided by synchronizing all downstream and upstream transmissions. Asymmetrical transmission rates are obtained by allocating more time for transmission in one direction rather than in the other.

Figure 1A:
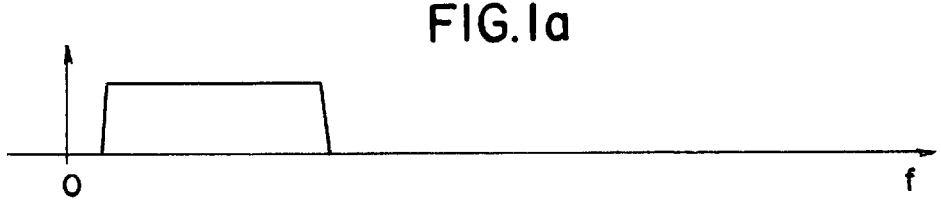
FIG. 1 Is a diagram which is used to illustrate that with the FDD technique, in principle a low-frequency band may be allocated for upstream transmission (a) and a separate high-frequency band allocated for downstream transmission (b) on the same medium.
Figure 1B:
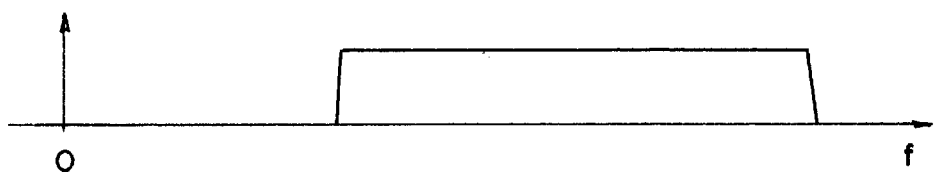

With the FDD technique, in principle a low-frequency band may be allocated for upstream transmission and a separate high-frequency band allocated for downstream transmission, as shown in FIG. 1. This configuration is currently considered by the International Telecommunications Union - Telecommunications Standardization Sector (ITU-T) for the standardization of G.Lite with nonoverlapped spectrum operation. G.Lite is a version of ADSL with provisions to facilitate installation and to allow operation in conjunction with other services. Because of the high rates considered for VHDL, however, overlapping and/or interleaving of the upstream and downstream frequency bands must be introduced. It turns out that FDD offers a larger transmission efficiency, provided means are included in VHDL transceivers to combat echo and alien NEXT.

The DMT-based Zipper Technique: Background Art

At this point, the DMT-based zipper technique for VDSL that has been proposed to ANSI in M. Isaksson, P. Deutgen, F. Sjoberg, S. K. Wilson, P. Odling, and P. O. Borjesson, "Zipper—A Flexible Duplex Method for VDSL," Proc. 1998 IEEE Int'l Conf. on Communications, paper S29-7, Atlanta, Ga., June 1998 is considered.

Figure 2A:
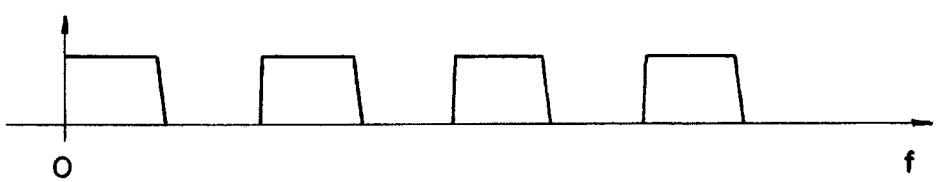
FIG. 2 Shows an example of the known zipper technique for upstream transmission (a) and downstream transmission (b).
Figure 2B:
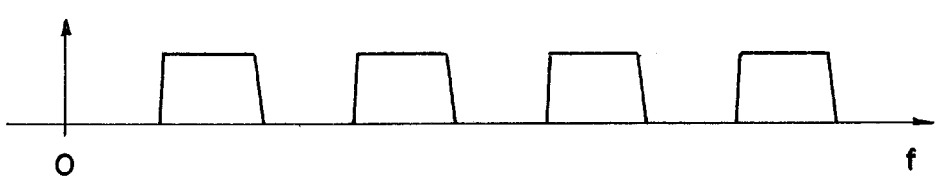
Figure 3A:
FIG. 3 Shows how a set of frequency bands may be chosen for VDSL upstream transmission such that there is no spectral overlapping with the frequency band allocated for ADSL downstream transmission (upstream transmission (a) and downstream transmission (b)). Frequency bands for VDSL transmission are shaded.
Figure 3B:
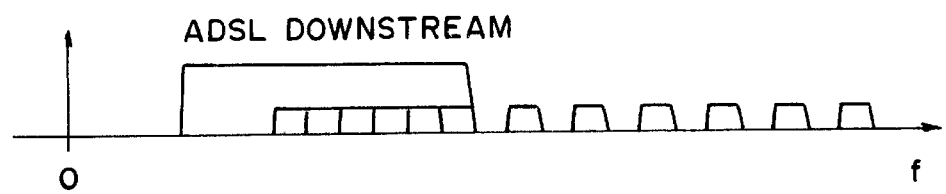

The Isaksson et al. reference is incorporated by reference herein in its entirety. The zipper technique can be explained as a FDD scheme, whereby different subchannels are allocated for downstream transmission from the central office transceiver (VTU-O) to the subscriber transceiver (VTU-R) and for upstream transmission in the opposite direction. An example of the zipper technique is illustrated in FIG. 2. This technique allows the upstream and downstream bandwidths to be split in various proportions. In particular, it is possible to achieve spectral compatibility between ADSL and VDSL. FIG. 3 shows how a set of frequency bands may be chosen for VDSL upstream transmission such that there is no spectral overlapping with the frequency band allocated for ADSL downstream transmission. With this configuration, NEXT signals generated by ADSL transmitters at the central office do not interfere with VDSL upstream signals. In general, VDSL offers sufficient flexibility to allow coexistence with an installed base of legacy xDSL systems.

Figure 4:
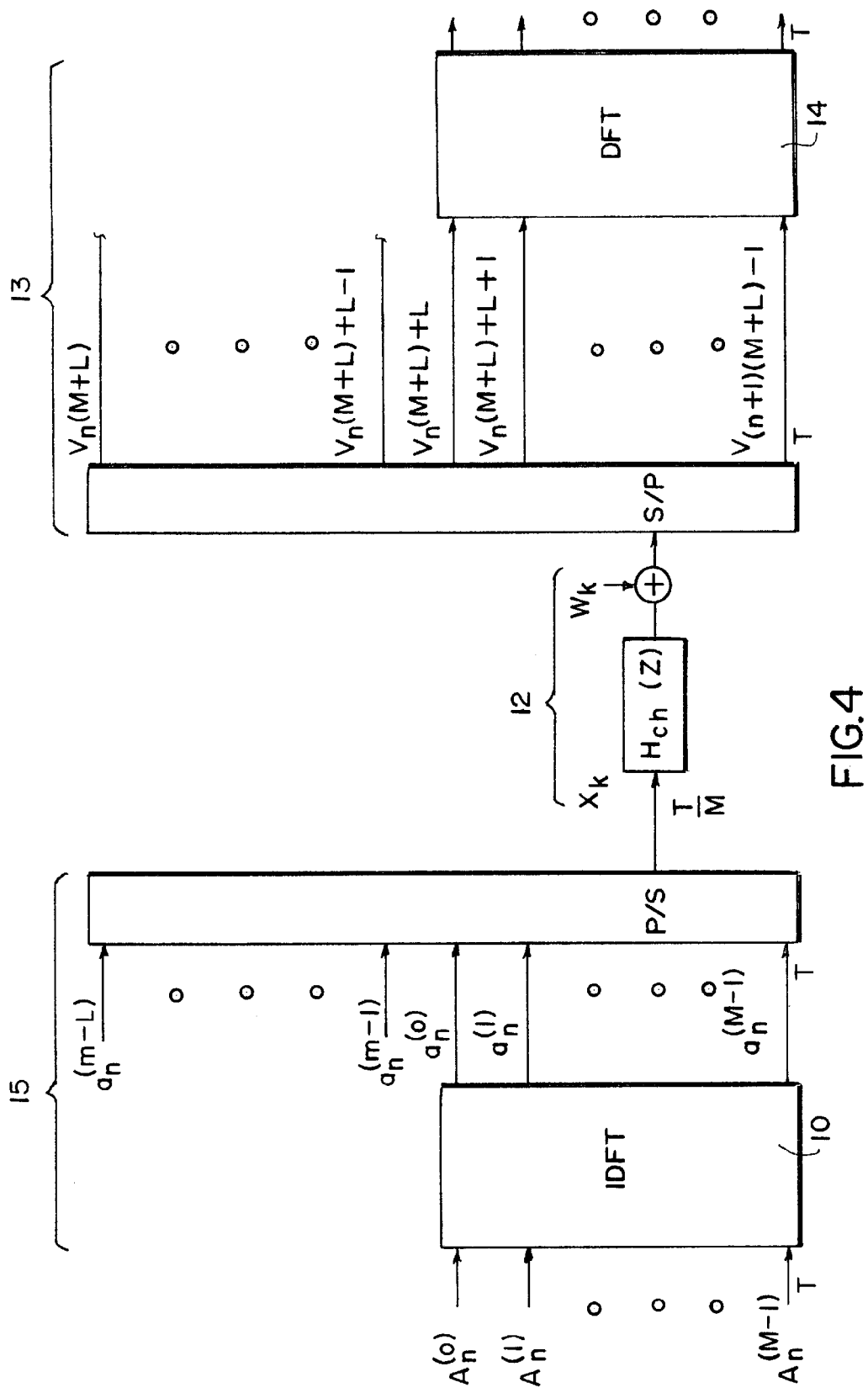
FIG. 4 Is a block diagram of a known DMT modulation system.

The block diagram of a DMT modulation scheme is illustrated in FIG. 4. Modulation by the inverse discrete Fourier transform (IDFT) unit 10 (which is part of a transmitter 15) of blocks of M input symbols is performed at the rate $1/T'=M/(M+L)T<1/T$. After modulation, each block of M signals is cyclically extended by copying the last L signals in front of the block. The parameter $1/T$ thus denotes the modulation rate of a system where the cyclic extension of signal blocks is not performed. The cyclic extension yields a signal vector with L+M elements, which are converted from parallel to serial by a converter 11. The obtained signals are transmitted over the channel 12 at the rate M/T. It is assumed that the length of the channel impulse response is less than or equal to L+1. At the receiver 13, blocks of samples with length L+M are taken. Block boundaries are placed such that the last M samples depend only on the elements of one cyclically extended block of signals. The first L samples are discarded, and the last M samples of the block are demodulated by the discrete Fourier transform (DFT) unit 14. The sequence of transmitted symbol vectors can then be detected by assuming a bank of M independent subchannels, at the price of a decrease in the transmission rate by a factor (M+L)/M. It is therefore essential that the number of subchannels is much larger than the length of the channel impulse response, so that the reduction in data rate due to the cyclic extension may be considered negligible. In practice, equalization must be employed to shorten the length of the channel impulse response.

Figure 5:
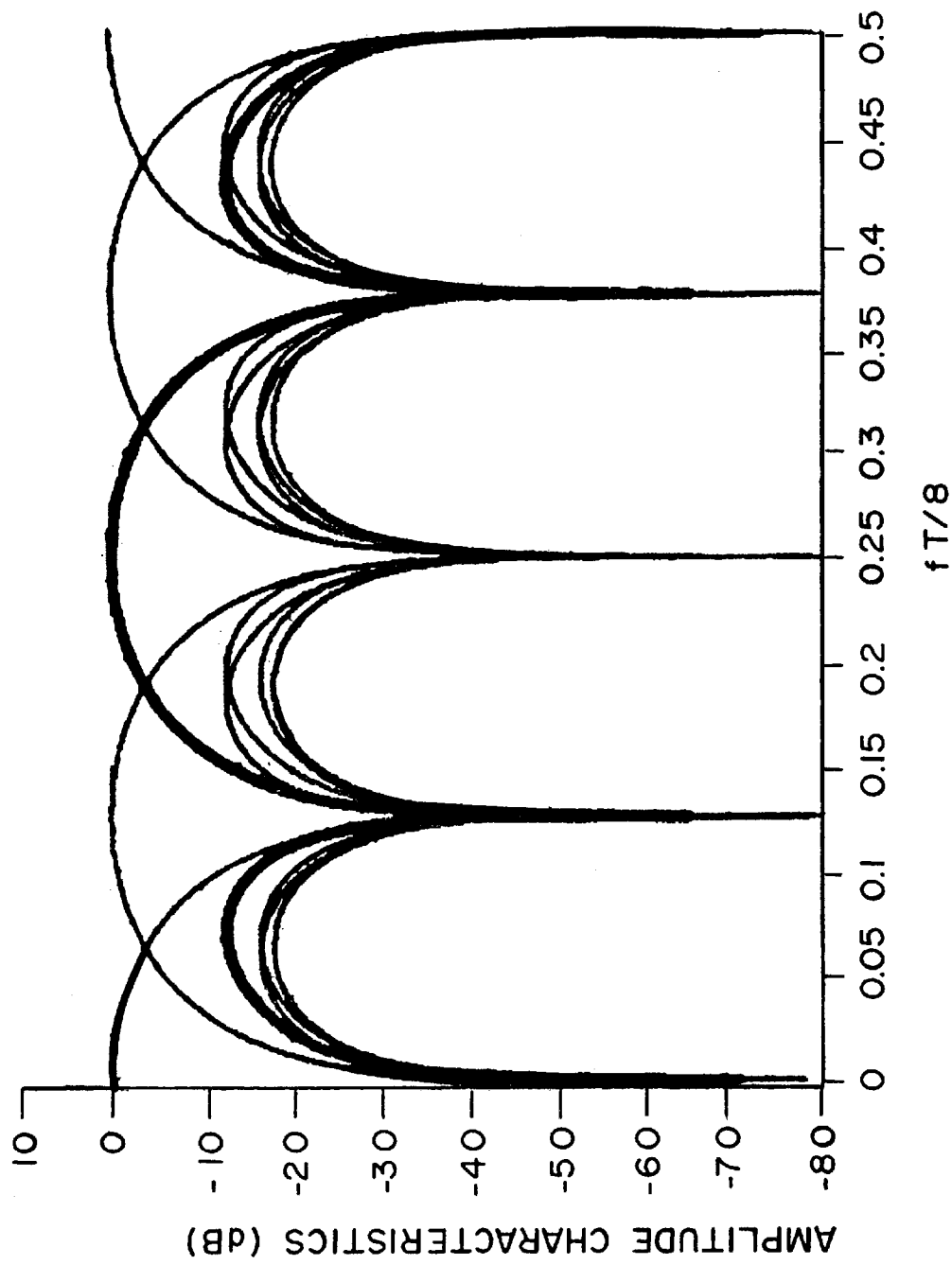
FIG. 5 Illustrates a DMT system with eight subchannels (M=8), showing a large amount of spectral overlap between adjacent subchannels.

The need for the addition of a cyclic extension, also known as cyclic prefix, arises because of the large amount of spectral overlap between adjacent subchannels, as illustrated in FIG. 5 for a DMT system with eight subchannels. As a further consequence of spectral overlapping, care must be taken to combat echo and NEXT in a DMT-based VDSL system that applies the zipper technique, even if distinct subchannel carrier frequencies are assumed for the two directions of transmission. To avoid the need for an increase in the length of the cyclic extension as well as the computational complexity of an interference canceller, equalization methods have been proposed to shorten both the interference impulse response and the channel impulse response jointly.

To mitigate self interference, represented by echo, and alien interference, represented by NEXT, the current DMT-based VDSL zipper proposal includes the addition of a cyclic suffix as well as of a cyclic prefix to each DMT vector. The addition of a cyclic suffix is required because the orthogonality conditions between subchannels are satisfied only if boundaries of a received vector can be placed such that the interference on the last M samples does not depend on the elements of two consecutive interfering DMT vectors. To suppress echo without introducing an exceedingly long cyclic suffix, it is therefore necessary to synchronize downstream and upstream transmissions, and the extra guard interval represented by the cyclic suffix must be larger than the round-trip delay between the VTU-O and the VTU-R. The same method can also be applied to suppress alien NEXT. Let us assume N links are established between the central office and the remote stations over twisted pairs that are bundled in the same multipair UTP cable. If the same length $\Delta_{max}$ of the cyclic suffix is adopted by all DMT vectors, where $\Delta_{max}$ is determined by the largest propagation delay between a VTU-O and a VTU-R, the orthogonality between tones relative to upstream and downstream transmissions can be maintained by synchronizing all 2N transmitters on every copper pair so that all transmissions of DMT vectors start simultaneously.

The price to pay for the increased transmission robustness that is obtained by the addition of a cyclic suffix consists in lower transmission efficiency, and higher protocol complexity because all transmitters must be synchronized. As a further consequence, the number of tones that need to be considered to obtain a reasonable efficiency is very large, which also results in higher transceiver implementation complexity.

FMT-based FDD Technique

In this section a FMT-based FDD technique is proposed for VDSL. With the term of FMT we indicate an OFDM transmission scheme based on a polyphase filter bank, which substantially increases the level of spectral containment of individual subchannels. As a result, the requirements for the addition of a cyclic prefix and a cyclic suffix to a transmitted vector and for the synchronization of downstream and upstream transmissions are avoided. If distinct subchannel carrier frequencies are assumed for the two directions of transmission, echo and NEXT signals are suppressed by the filtering operations executed at the FMT modulator and demodulator.

Figure 6:
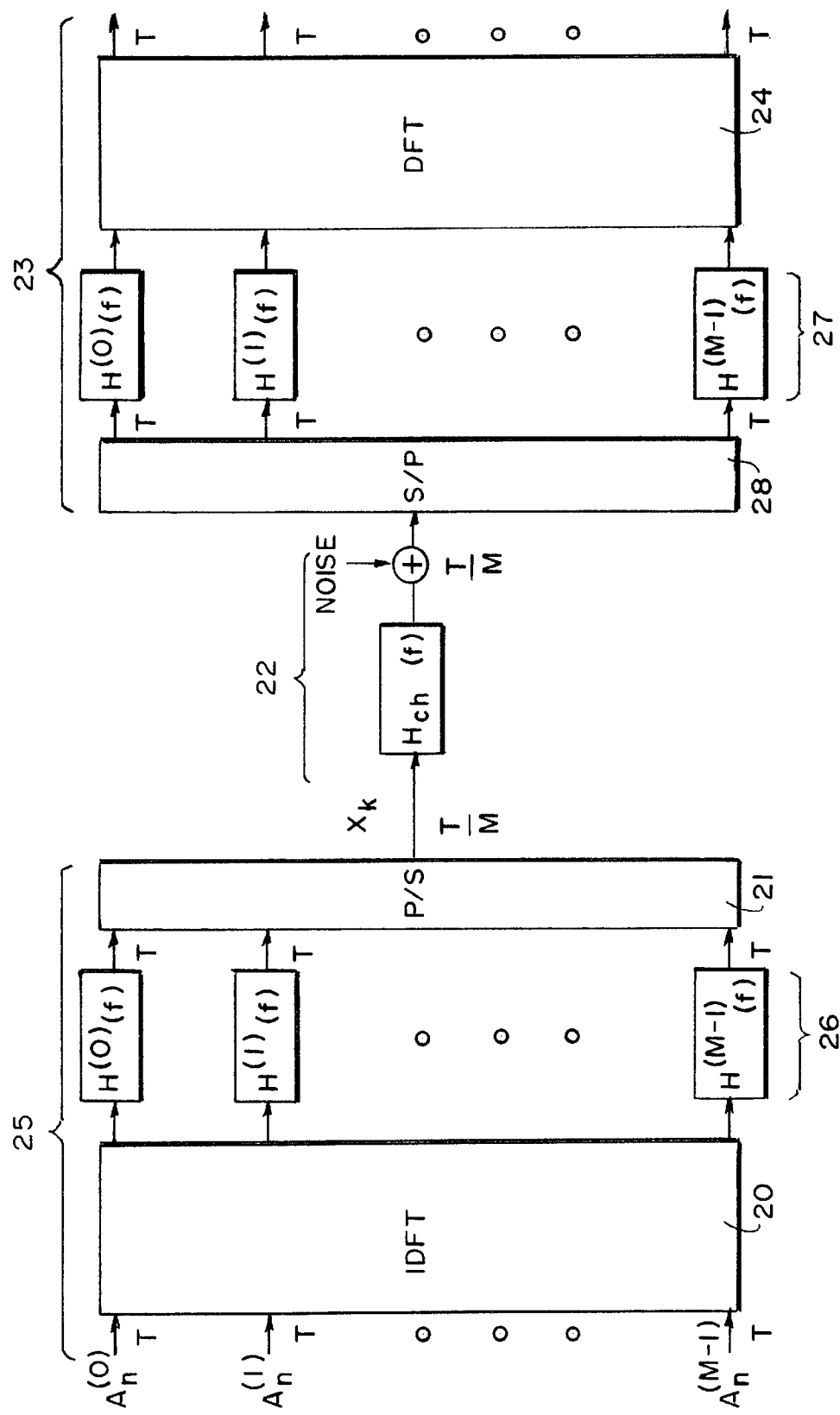
FIG. 6 Is a block diagram showing an efficient implementation of the present invention.
Figure 7A:
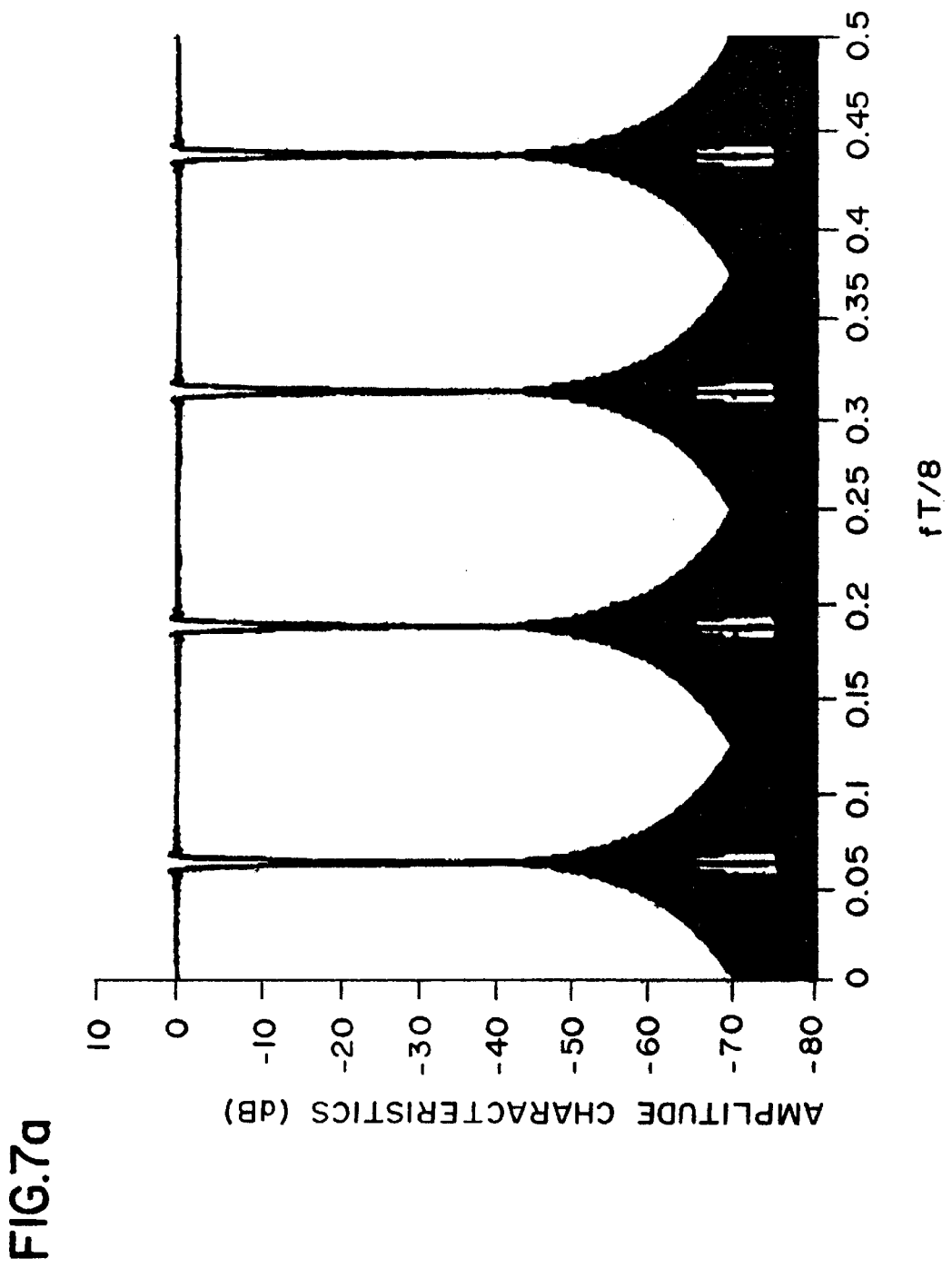
FIGS. 7(a) 7(b) illustrate the frequency response of subchannel filters in FMT systems with M=8 and prototype filter designed for 7(a) ρ=1 and γ=64, and 7(b) ρ=0.1 and γ=6.
Figure 7B:
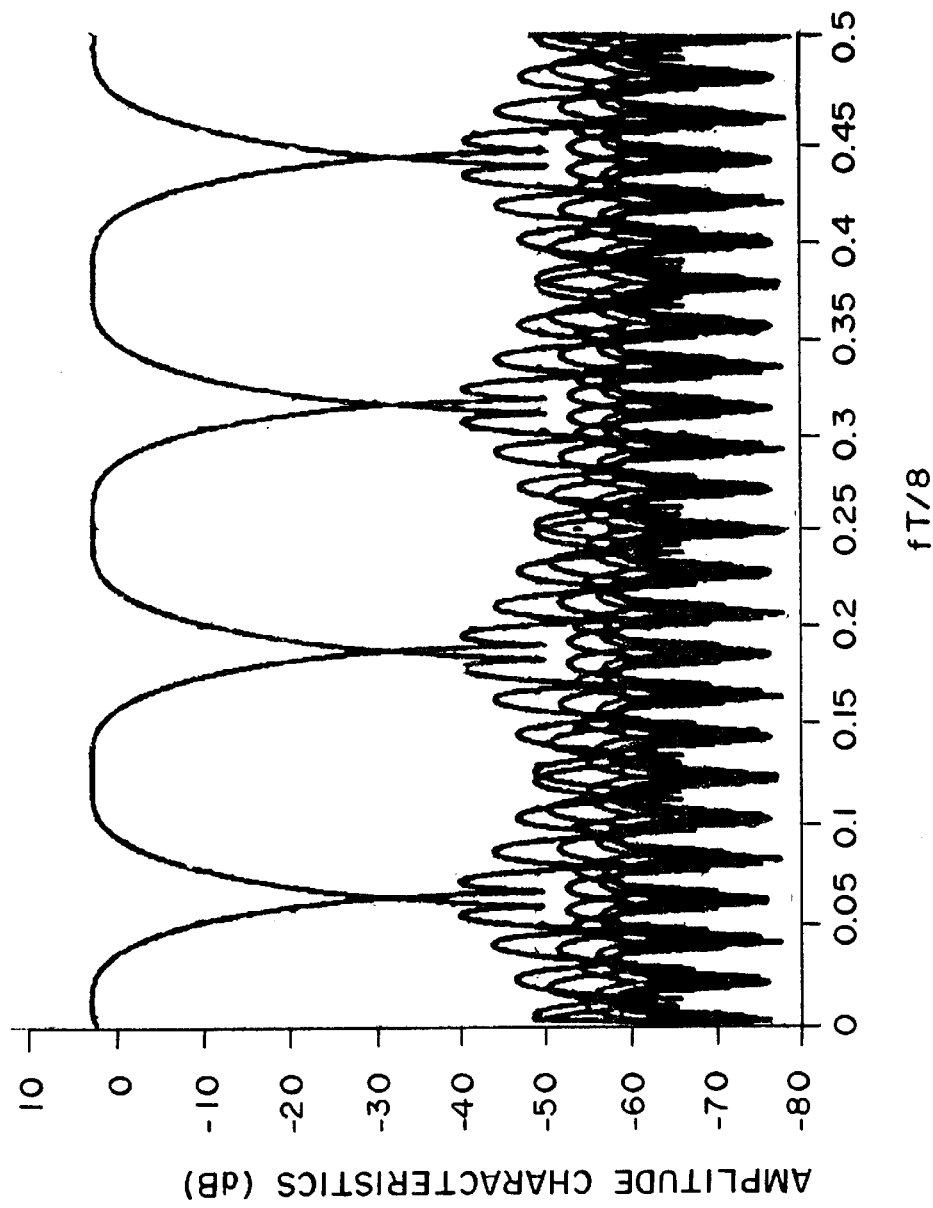

The block diagram of an OFDM system with efficient implementation is illustrated in FIG. 6. The complex-valued input symbols $$A_n = \{A_n^{(i)}, i = 0, \ldots, M-1\}$$

are chosen from M, in general not identical, QAM (quadrature-amplitude modulation) constellations at the modulation-rate 1/T. Note that other symbol constellations can be used instead. For communications systems like VDSL, where baseband signals do not have to be translated to a carrier frequency before transmission, we assume that M is even, and that each block of input symbols satisfies the Hermitian symmetry conditions, i.e., $$A_n^{(0)}$$

and $$A_n^{(M/2)}$$

are real valued, and $$A_n^{(i)} = [A_n^{(M-i)}]^*, i = 1, \ldots, M/2 - 1,$$

where the asterisk denotes complex conjugation. Then the signals $$a_n = \{a_n^{(i)}, i = 0, \ldots, M-1\}$$

that are obtained at the output of the IDFT 20 are real valued. The IDTF 20 is part of a transmitter 25. These signals are processed by an M-branch polyphase network 26. The i-th subchannel, $0 \leq i \leq M/2$ can be considered as a prototype baseband channel that is translated in frequency by i/T Hz. The prototype filter approximates an ideal filter with minimum bandwidth. In the present context, we consider for example an ideal filter with frequency response for f in the interval $$\left[-\frac{M}{2T}, \frac{M}{2T}\right]$$

given by $$H_{ideal}(f) = \begin{cases} \left|\frac{1+e^{-j2\pi fT}}{1+\rho e^{-j2\pi fT}}\right| & \text{if } -1/2T \leq f \leq 1/2T \\ 0 & \text{otherwise} \end{cases} \quad (1)$$

where the parameter $0 \leq \rho \leq 1$ controls the spectral roll-off of the prototype filter. Note that the frequency response (1) exhibits spectral nulls at the bandedges and is periodic with period M/T. FIGS. 7(a) and 7(b) illustrate the level of subchannel spectral containment achieved by FMT modulation with parameter values M=8, $\rho$=1, $\gamma$=64 and M=8, $\rho$=0.1, $\gamma$=6, respectively. Background information is also described in a set of lecture notes (cf. section 6.13 for example) authored by one of the inventors G Cherubini [18].

To ensure that transmission free of intersymbol interference (ISI) within a subchannel, as well as free of interchannel interfrence (ICI) between subchannels is achieved, a generalized Nyquist I criterion must hold. Assume the channel 22 is ideal with frequency response $H_{ch}(f)$=1, and the transmit 26 and receive filters 27, which are respectively obtained by translation in frequency of the transmit and receive prototype filters, satisfy the symmetry conditions $g_n(i) = h^*_{-n}(i)$, $i=0, \ldots, M-1$. Then the generalized Nyquist I criterion in the time domain is given by $$\sum_n h_n(i) h^*_{n-kM}(j) = \delta_{i-j} \delta_k, \quad 0 \leq i, j \leq M-1, \quad (2)$$

where $\delta_i$ is defined as the Kronecker delta. The elements of a set of orthogonal filter impulse responses that satisfy (2) are sometimes referred to as "wavelets". To approximate ideal minimum-bandwidth filters, linear-phase FIR prototype filters are employed. We consider FIR transmit and receive prototype filters with impulse responses that have equal length $\gamma$M, i.e., $h_k$ may assume nonzero values only if k=0, ..., $\gamma$M–1, and that satisfy the condition $g_k = h^*_{gM-1-k}$. Various tradeoffs in terms of ICI and ISI levels versus prototype filter implementation complexity are possible.

The M filter outputs are converted from parallel to serial by a parallel-to-serial converter 21 to yield the baseband FMT signal $x_k$ at the transmission rate M/T. The signal $x_k$ is converted by a digital-to-analog (D/A) converter to an analog signal, filtered by an analog transmit filter, and transmitted over the channel 22. The signal at the receiver input of receiver 23 is filtered by an analog receive filter, and sampled at the rate M/T by an analog-to-digital converter (A/D). The obtained samples are converted from serial to parallel by a serial-to-parallel converter 28, and filtered by an M-branch polyphase network 27 followed by a DFT 24. If the system were ideal, the vector obtained at the DFT 24 output could be directly employed to determine an estimate of the transmitted sequence of information symbols. In practice, it is necessary to further equalize the signal to eliminate residual intersymbol interference. Residual interchannel interference can be considered negligible even for moderate lengths of the prototype filter. After adaptive equalization, which is performed on the individual subchannel output sequences at rate 1/T, symbol estimation takes place.

The frequency responses of FMT subchannels are characterized by steep roll-off towards the band-edge frequencies, where they exhibit near spectral nulls. This suggests that per-subchannel decision-feedback equalization be performed to recover the transmitted symbols. In transmission systems with trellis coding, the function of decision-feedback filtering is preferably performed at the transmitter by employing precoding techniques as in M. V. Eyuboglu and G. D. Forney, Jr., "Trellis Precoding: Combined Coding, Precoding and Shaping for Intersymbol Interference Channels," IEEE Trans. Inform. Theory, vol. 38, pp. 301–314, March 1992. In this case, optimal detection is achieved by implementing at the receiver only the equalizer forward section, which approximates the whitened matched filter, and by implementing at the transmitter the feedback section as a precoder. In particular, trellis augmented precoding is the most suitable approach for joint trellis coding and precoding for transmission over channels with spectral nulls; (U.S. patent application Ser. No. 947,356, filed Oct. 8, 1997, to G. Cherubini, S. Ölcer, and G. Ungerboeck, entitled "Transmission Method and Apparatus Employing Trellis Augmented Precoding" the contents of which are hereby incorporated by reference in their entirety. An essential element of trellis augmented precoding is Tomlinson-Harashima (TH) precoding; See M. Tomlinson, "New Automatic Equalizer Employing Modulo Arithmetic," Electron. Lett., vol7, pp.138–139, March 1971 and H. Harashima and H. Miyakawa, "Matched Transmission Technique for Channels with Intersymbol Interference," IEEE Trans. Commun., vol COM-20, pp. 774–780, August 1972.J, both of which references are incorporated by reference in their entirety. Herein, uncoded FMT transmission employing per-subchannel TH precoding is considered. Extension to the case of a system with coded modulation employing trellis augmented precoding is straightforward.

Remark 1: it is possible to remove the constraint that the input symbol vectors satisfy the Hermitian symmetry conditions; in that case we obtain a sequence of complex vectors of signals $a_n$ at the IDFT output; the complex signal $x_k$ obtained after polyphase filtering and parallel-to-serial conversion must then be interpolated and filtered by a transmit phase-splitter filter; the real part of the phase-splitter filter output is extracted and transmitted over the real channel. At the receiver, the channel output signal is oversampled and filtered by a receive phase-splitter filter; the phase-splitter output signal is decimated and input to an FMT demodulator for estimation of the sequence of complex vectors of input signals.

Remark 2: discrete wavelet multitone (DWMT) modulation (as in S. D. Sandberg and M. A. Tzannes, "Overlapped Discrete Multitone Modulation for High Speed Copper Wire Communications," IEEE J. Select. Areas Commun., vol. 13, pp. 1571–1585, December 1995 the contents of which are incorporated by reference herein) may be viewed as a particular case of FMT with real input symbol vectors and special grouping of subchannel filters; the prototype filter is usually designed such that perfect reconstruction of the transmitted input symbol vector is possible at the DWMT demodulator output under the assumption of an ideal channel without noise and distortion; perfect reconstruction requires that some overlap of adjacent subchannels is allowed; therefore it is possible to design a DWMT-based VDSL zipper technique with high efficiency and without the need for synchronization of downstream and upstream transmissions, provided some measures are taken to suppress at the output of each subchannel echo and NEXT signals that exhibit non-negligible spectral components in the subchannel frequency band.

Remark 3: the choice of the prototype filter for the realization of the polyphase filter bank allows various tradeoffs between number of subchannels, level of spectral containment, complexity of implementation, and signal latency. These tradeoffs are possible because the number of subchannels in a FMT transmission system can be reduced without incurring a transmission efficiency loss, while with DMT the number of subchannels is constrained to be very large due to the addition of a cyclic prefix and a cyclic suffix to the transmitted vectors. Typical parameter values for a DMT-based and a FMT-based VDSL zipper system are summarized in Table 1. For the FMT system, prototype filters with $\gamma=16$ for the realization of transmit and receive polyphase filter banks, and per-subchannel equalization introducing a delay of 16 modulation intervals are assumed.

TABLE 1

Typical parameter values for a DMT-based and a FMT-based VDSL zipper system.

| Parameter | DMT-based zipper | FMT-based zipper |
|---|---|---|
| Transmission rate M/T | 22.08 Msamples/s | 22.08 Msamples/s |
| Number of subchannels M | 4,096 | 128 |
| Cyclic extension | 465 samples | 0 samples |
| Modulation interval T | 206.6 μsec | 5.8 μsec |
| Carrier spacing | 5.4 kHz | 172.5 kHz |
| Latency | ~400 μsec | ~300 μsec |

Figure 8:
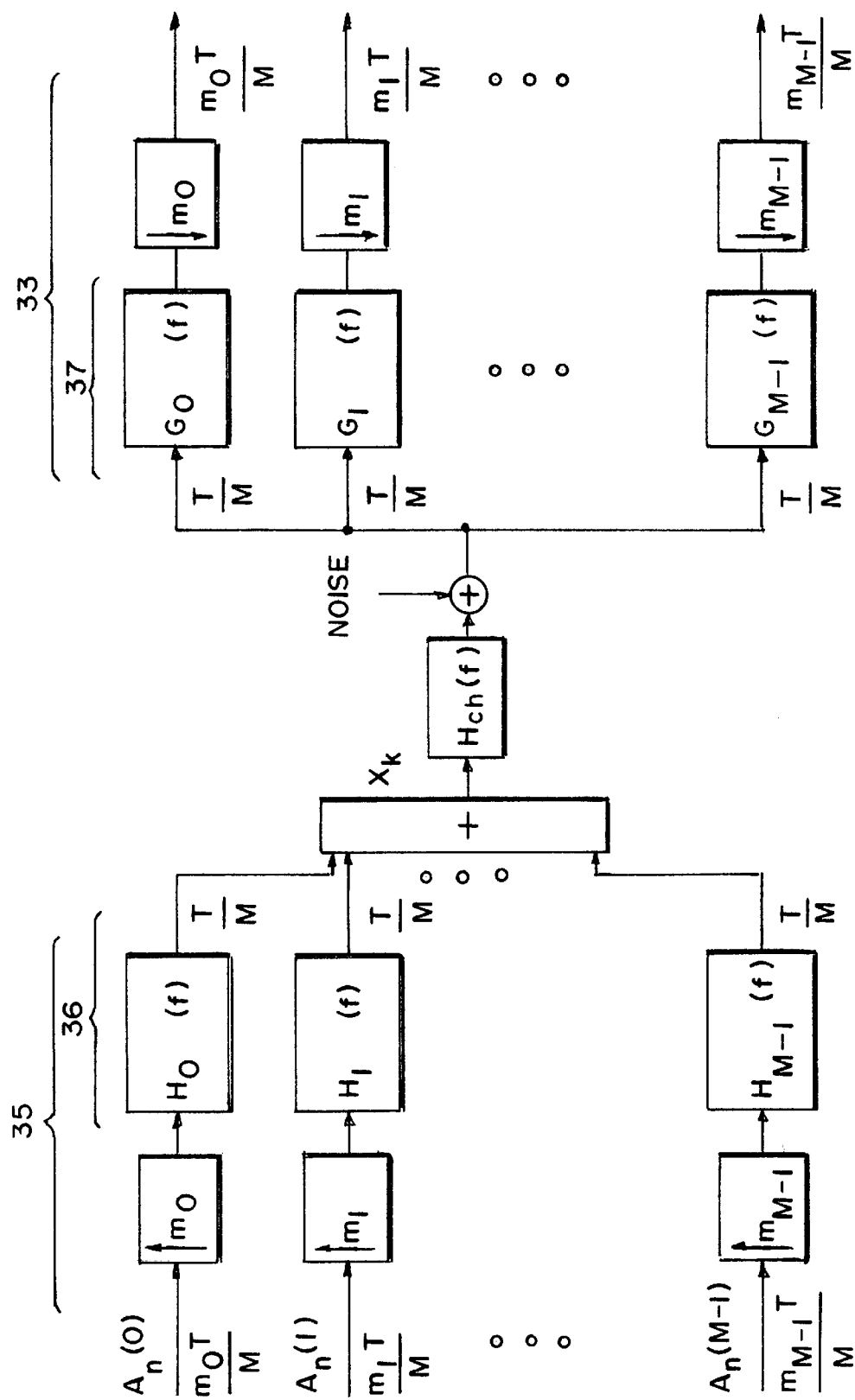
FIG. 8 is a block diagram showing a generalization of the transmission system in accordance with the present invention.

Remark 4: We referred to OFDM systems yielding M subchannels, all having the same bandwidth equal to 1/T Hz. In a FMT system, the subchannels further exhibit almost zero spectral overlap and spectral nulls at the bandedges. The considered OFDM systems can be generalized as shown in FIG. 8, where the integers $m_i$, i0, ..., M−1, are such that $$\sum_{i=0}^{M-1} \frac{1}{m_i} = 1.$$

The transmit filters 36 of transmitter 35 and receive filters 37 of receiver 33 for the i-th subchannel, denoted by $H_i(f)$ and $G_i(f)$, respectively, have each total bandwidth$\approx M/(m_i T)$Hz, and satisfy the condition $G_i(f)=H_i^*(f)$, i0, ..., M−1. If we choose the transmit filters 36 such that their frequency responses exhibit almost zero overlap, and spectral nulls at the bandedges, we obtain a generalization of a FMT system. To reduce the complexity of the direct implementation of FIG. 8, one may resort for example to a tree-structured filter bank. [See: P. P. Vaidyanathan, "Multirate Systems and Filter Banks, Englewood Cliffs, N.J.: Prentice-Hall, 1992]

Echo Cancellation for Full-duplex FMT Transmission Systems

FMT transmission allows the extension of the VDSL zipper technique to full-duplex VDSL transmission with echo cancellation, whereby all subchannels may be used simultaneously for upstream and downstream transmission. The lower modulation rate and/or spectral efficiency that are required to achieve the same rate of transmission of information represent a clear advantage of full-duplex VDSL over techniques such as zipper or time-division duplexing.

Echo Cancellation for DMT Transmission: Background Art

Figure 9:
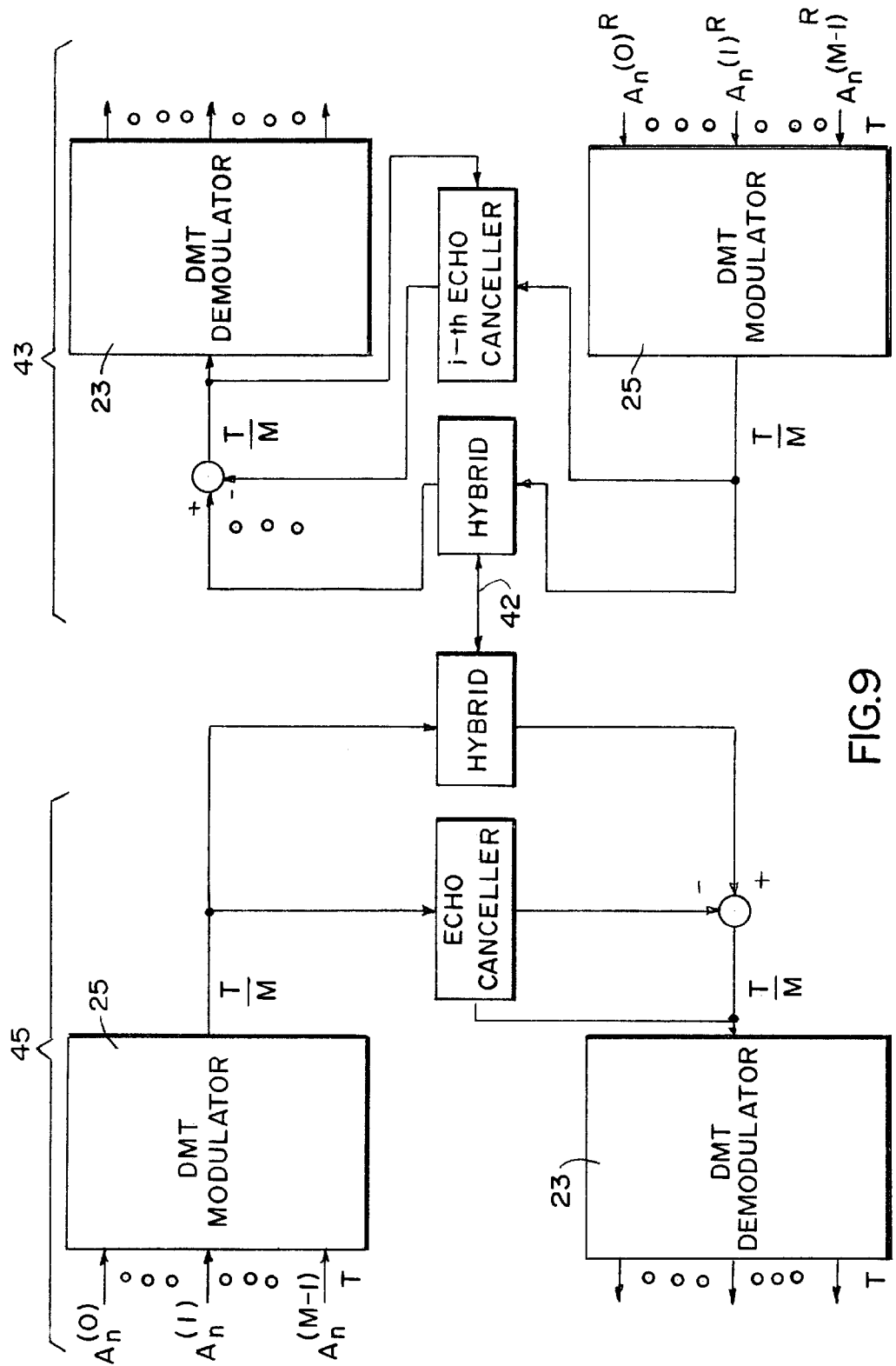
FIG. 9 illustrates echo cancellation in the time domain of a known full-duplex DMT transmission system.

In a full-duplex DMT transmission scheme, two approaches may be considered to perform digital adaptive echo cancellation. We first consider echo cancellation in the time domain, as illustrated in FIG. 9. The transmitted signal $x_k$ is input to the adaptive echo canceller, which computes an estimate $\hat{u}_k$ of the echo signal that is subtracted from the received signal after the A/D converter. The result represents a cancellation error that is used to update the echo canceller coefficients using the least mean square (LMS) algorithm. There are several drawbacks, however, of such an approach, that can be summarized as follows:

- echo canceller operations take place at the high rate M/T, rather than at the modulation rate 1/T at which the other filtering operations are performed;
- the binary representation of the real echo canceller input signal $x_k$ requires several bits, typically 12 to 15, which means a large complexity for the realization of the multipliers needed to compute the products between the signals stored in the filter delay line and the filter coefficients;
- the received signal after the A/D converter is given by the sum of the signal from the remote transmitter, the echo, and additive channel noise; steady-state performance of the echo canceller depends on the level of the noise added to the echo signal; with the considered realization, the signal from the remote transmitter represents a large noise signal in which the echo is embedded, and cannot be easily separated from the residual echo after cancellation; it is therefore more difficult to achieve optimum system performance as compared to a scheme where an estimate of the signal from the remote transmitter can be subtracted from the cancellation error before adaptation of the filter coefficients. [See: D. D. Falconer, "Adaptive Reference Echo-Cancellation," IEEE Trans. Commun., vol. 30, pp. 2083–2094, September 1982.]

The second approach considers cancellation in the frequency domain. See: M. Ho, J. M. Cioffi, and J. A. C. Bingham, "Discrete Multitone Echo Cancelation," IEEE Trans. Commun., vol. 44, pp. 817–825, July 1996, the entire contents of which are hereby incorporated by reference herein.

Let the real-valued discrete-time echo impulse response be denoted by $\{h_{E,i}, i=0, \ldots, N-1\}$, with length N<M. We initially assume N≤L+1, where L is the length of the cyclic prefix. Furthermore, we assume that the boundaries of the received blocks are placed such that the last M samples of the n-th received block are expressed by the vector $$v_n = \Gamma_n^R h + \Gamma_n h_E + w_n, \quad (3)$$

where $\Gamma_n^R$ is a circulant matrix with elements given by the signals from the remote transmitter, $\Gamma_n$ is a circulant matrix with elements given by the signals from the local transmitter, h is the vector of the channel impulse response extended with M−L−1 zeros, and $h_E$ is the vector of the echo impulse response extended with M−N zeros. The echo is expressed in the frequency domain as $U_n = \text{diag}(A_n)H_E$, where $\text{diag}(A_n)$ denotes the diagonal matrix with elements on the diagonal given by $A_n$, and $H_E$ denotes the DFT of the vector $h_E$. Then the echo canceller provides an echo estimate that is given by $\hat{U}_n = \text{diag}(A_n)C_{E,n}$, where $C_{E,n}$ denotes the DFT of the vector $c_{E,n}$ of the N coefficients of the adaptive echo canceller filter extended with M−N zeros. Therefore the cancellation error in the frequency domain is given by $$Z_n = F_M v_n - \hat{U}_n, \quad (4)$$

where $F_M$ is the M×M DFT matrix defined as $$F_M = \left[\left(e^{-j\frac{2\pi}{M}}\right)^{km}\right], \quad k, m = 0, \ldots, M-1.$$

In this case, a low-complexity frequency-domain implementation of the echo canceller an of the LMS algorithm is possible.

Figure 10:
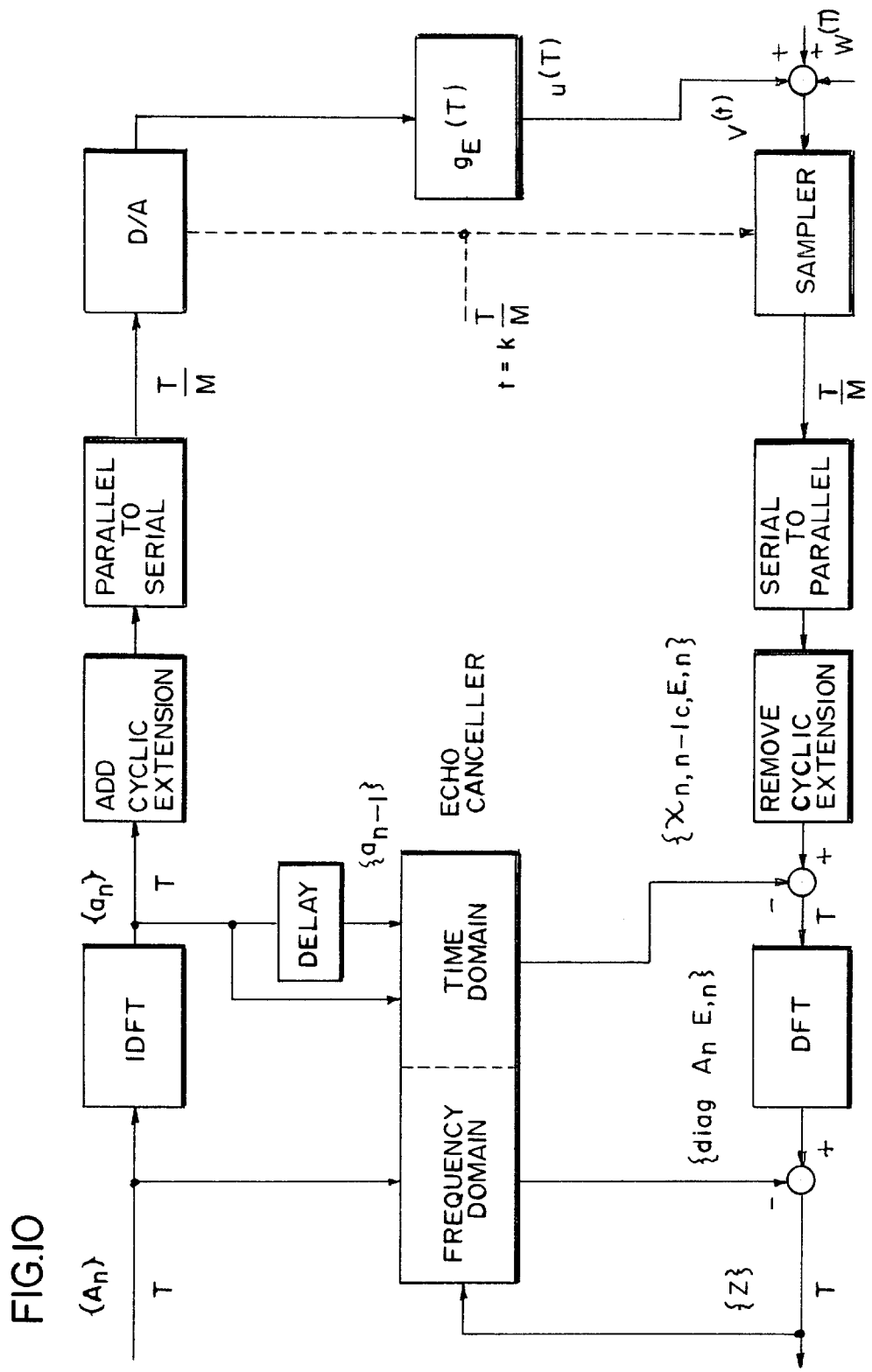
FIG. 10 illustrates a two-part echo cancellation technique for a known DMT transmission system.

In practice, however, we need to consider the case L+1<N≤M. For this case a two-part echo cancellation technique has been proposed, as illustrated in FIG. 10. First, in the time domain, a short convolution is performed and the result subtracted from the received signals to compensate for the insufficient length of the cyclic extension. Second, in the frequency domain, cancellation of the residual echo is performed over a set of M independent echo subchannels. We note that this method does not completely avoid the drawbacks of echo cancellation in the time domain. As mentioned further above, the computational complexity of an echo canceller for DMT that is based on the described approach may be reduced by equalization methods that shorten both the interference and the channel impulse responses jointly; P. J. W. Melsa, R. C. Younce, and C. E. Rohrs, "Impulse Response Shortening for Discrete Multitone Transceivers," IEEE Trans. Commun., vol. 44, pp. 1662–1672, December 1996.

Echo cancellation for full-duplex DMT transmission can be performed entirely in the frequency domain also for N>L+1. In this case, however, it would be necessary to cancel at the output of each subchannel all M distinct echo signals generated by the tones of a DMT signal. The implementation of such an approach would therefore require $M^2$ adaptive echo cancellers, and result in a very large implementation complexity.

Per-subchannel Echo Cancellation

Figure 11:
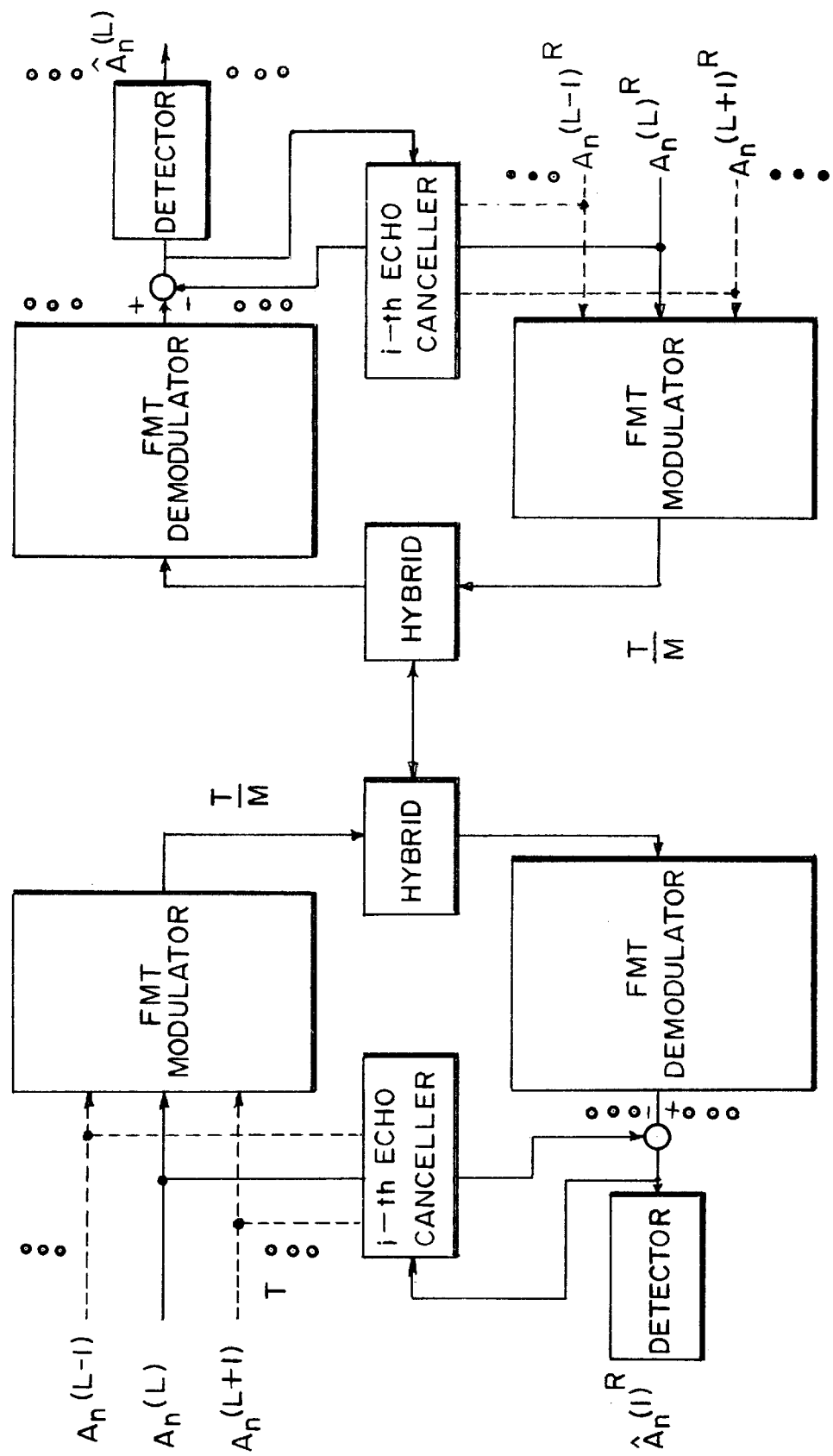
FIG. 11 illustrates a per-subchannel echo cancellation for full-duplex FMT transmission in accordance with the present invention.

Because of the high level of spectral containment of individual subchannels, echo cancellation for full-duplex FMT transmission can be performed entirely in the frequency domain by taking into account for each subchannel only the echo generated by transmission in the opposite direction on the same subchannel. The implementation of per-subchannel echo cancellation then requires M adaptive echo cancellers. The method is illustrated in FIG. 11. Note that in FIG. 11 the dashed lines indicate additional inputs to the echo canceller unit that need to be considered in systems where some amount of spectral overlap between adjacent subchannels is allowed, e.g., DWMT systems. Assuming that the echo signal at the output of a subchannel does not depend on transmission over other subchannels, the signals that are obtained after demodulation by the DFT can be expressed as $$V_n^{(i)} = \sum_{m=-\infty}^{\infty} A_m^{(i)R} h_{n-m}^{(i)} + \sum_{m=-\infty}^{\infty} A_m^{(i)} h_{E,n-m}^{(i)} + w_n^{(i)}, \quad i = 0, \ldots, M-1, \quad (5)$$

where $$\{A_m^{(i)R}\}$$

is the sequence of symbols sent by the remote transmitter over the i-th subchannel, $$\{w_n^{(i)}\}$$

is a sequence of additive Gaussian noise samples, and $$h_n^{(i)}$$

and $$h_{E,n}^{(i)}$$

denote the overall i-th subchannel signal and echo impulse responses, respectively.

The M echo cancellers generate estimates $$\hat{U}_n^{(i)}, i = 0, \ldots, M-1,$$

of the echo signals. Assuming the cancellers are realized as transversal filters all having N coefficients, the estimates are given by $$\hat{U}_n^{(i)} = \sum_{m=0}^{N-1} c_{E,m,n}^{(i)} A_{n-m}^{(i)}, \quad i = 0, \ldots, M-1, \quad (6)$$

where $$c_{E,n}^{(i)} = (c_{E,0,n}, \ldots, c_{E,N-1,n}^{(i)})'$$

denotes the vector $$c_{E,n}^{(i)}$$

of coefficients of the i-th echo canceller, and prime denotes the transpose of a vector. The estimates are subtracted from the received subchannel signals to yield cancellation error signals given by $$Z_n^{(i)} = V_n^{(i)} - \hat{U}_n^{(i)}, \quad i = 0, \ldots, M-1. \quad (7)$$

Using the LMS algorithm, updating of the echo canceller coefficients is then obtained by $$c_{E,m,n+1}^{(i)} = c_{E,m,n}^{(i)} + \alpha Z_n^{(i)} A_{n-m}^{(i)}, \quad m = 0, \ldots, N-1, i = 0, \ldots, M-1, \quad (8)$$

where α is the adaptation gain.

Remark 5: the data signal can be adaptively removed from the cancellation error by performing per-subchannel echo cancellation after equalization.

Remark 6: the speed of convergence of the i-th echo canceller depends in general on the variance of the symbols of the constellation that is adopted by the local transmitter for transmission on the i-th subchannel; because the constellations adopted for transmission over the M subchannels may be different, using only one value of adaptation gain may result in slow convergence of some echo cancellers; to obviate this problem, variable adaptation gains can be used, so that fastest possible convergence of all echo cancellers is achieved.

Remark 7: for systems such as DWMT, where some amount of spectral overlap is permitted between adjacent subchannels, cancellation of non-negligible echo components generated by transmission over adjacent subchannels must be also performed J. Yang, S. Roy, and N. H. Lewis, "Data-driven echo cancellation for a multitone modulation system," IEEE Trans. Commun., vol. 42, pp. 2134–2144, May 1994; this can be achieved by including additional filters for echo cancellation; in the system illustrated in FIG. 11, the i-th echo canceller unit has three filters; the dashed lines indicate two symbol sequences, which are input to additional filters for the cancellation of echo components that are generated by transmission over adjacent subchannels.

A typical digital communications system according to the present invention comprises a channel 42 connecting a first transceiver 45 and a remote transceiver 43 for bidirectional transmission of information. The channel 42 has a bandwidth of $1/T_c$ Hz and is divided into M subchannels. The system employs M subcarriers for the transmission of blocks of M symbols from symbol constellations over said M subchannels. The transmission over the i-th subchannel, with i=0, . . . , M−1, takes place at a modulation rate of $1/(m_i T_c)$ symbols/s, and the i-th subchannel has a bandwidth of $1/(m_i T_c)$ Hz, where the numbers $m_i$ satisfy the condition $$\sum_{i=0}^{M-1} \frac{1}{m_i} = 1.$$

At least one subchannel of the M subchannels has spectral nulls at the bandedges, and at least one subchannel of said M subchannels has zero guard bands.

Various modifications of the above disclosed embodiments will be apparent to those experienced in the art.

What we claim and desire to protect by Letters Patent is:

1. A digital transmission scheme for use in digital subscriber line (DSL) communication systems comprising a channel with bandwidth of $1/T_c$ Hz, employing M subcarriers for transmission of blocks of M symbols, each taken from a symbol constellation over M subchannels, where the transmission over the i-th subchannel, with i=0, . . . , M−1, takes place at a modulation rate of $1/(m_i T_c)$ symbols/s, the i-th subchannel has a bandwidth of $1/(m_i T_c)$ Hz, where the numbers $m_i$ satisfy the condition $$\sum_{i=0}^{M-1} \frac{1}{m_i} = 1$$

at least one subchannel has spectral nulls at the bandedges, and at least one subchannel has zero guard bands.

2. The scheme according to claim 1, where each subchannel has a high level of spectral containment.

3. The scheme according to claim 1 having negligible interchannel interference.

4. The scheme according to claim 1, where said M subcarriers are orthogonal.

5. The scheme according to claim 1, where said symbol constellation is a QAM (quadrature-amplitude modulation) constellation.

6. The scheme according to claim 5, where there are M QAM (quadrature-amplitude modulation) constellations which are not identical.

7. The scheme according to claim 1, where $m_i$=M for all i, such that each of said subchannels has a bandwidth equal to $1/(MT_c)$=1/T Hz, and such that the bandwidth of said channel is equal to M/T Hz.

8. The scheme according to claim 7, where prior to said transmission the signals are filtered by filtering means at a transmitter to obtain a subchannel's spectral characteristic.

9. The scheme according to claim 7, where filtering means are employed at a receiver for filtering of transmitted signals after reception.

10. The scheme according to claim 8, where said filtering means at a transmitter have a frequency response which is obtained by shifting in frequency by i/T Hz, with i=0, . . . , M−1, the frequency response of a transmitter prototype filter which approximates an ideal filter with zero frequency response outside of the interval [−½T, ½T].

11. The scheme according to claim 9, where said filtering means at a receiver have a frequency response which is obtained by shifting in frequency by i/T Hz, with i=0, . . . , M−1, the frequency response of a receiver prototype filter which approximates an ideal filter with zero frequency response outside of the interval [−½T, ½T].

12. The scheme according to claim 10, where said transmitter prototype filter is a filter with an amplitude characteristic which approximates a frequency response that exhibits spectral nulls at ±½T.

13. The scheme according to claim 10, where said receiver prototype filter is a filter with an amplitude characteristic which approximates a frequency response given by $$H_{ideal}(f) = \begin{cases} \left| \frac{1 + e^{-j2\pi fT}}{1 + \rho e^{-j2\pi fT}} \right| & \text{if } -1/2T < f < 1/2T \\ 0 & \text{otherwise} \end{cases}$$

where the parameter $0 \leq \rho \leq 1$ controls the spectral roll off of said prototype filter.

14. The scheme according to claim 2, where each subchannel has the same bandwidth of 1/T Hz.

15. The scheme according to claim 8, where said filtering means at a transmitter (25) are realized by the cascade of an inverse discrete Fourier transform (IDFT) unit (20), followed by an M-branch filter bank network (26) where a filter on the i-th branch is given by the i-th polyphase component of the transmitter's prototype filter, and a parallel-to-serial converter (21) yielding a signal transmitted over said channel (22) at the rate of M/T samples/s.

16. The scheme according to claim 9, where said filtering means at a receiver (23) are realized by the cascade of a serial-to-parallel converter (28) yielding M signals in parallel at the rate of 1/T samples/s, an M-branch filter bank network (27) where a filter on the i-th branch is given by the i-th polyphase component of said receiver prototype filter, followed by a discrete Fourier transform (DFT) unit (24).

17. The scheme according to claim 1, where detection is achieved by per-subchannel equalization employing a linear equalizer, or a Viterbi detector.

18. The scheme according to claim 17, where said per-subchannel equalization is realized by a decision-feedback equalizer.

19. The scheme according to claim 18, where the feedback section of said decision-feedback equalizer is implemented as a precoder in the transmitter.

20. The scheme according to any of the preceding claims, where time-domain filtering is carried out for adjustment of the system's channel phase characteristic.

21. The scheme according to any of the preceding claims, where oversampling of subchannel output signals is performed to allow interpolation/equalization of said subchannel output signals prior to symbol detection.

22. The scheme according to claim 1, where each of said blocks of M symbols satisfies Hermitian symmetry conditions such that signal samples transmitted over a channel are real valued.

23. A digital communications system for bidirectional transmission of information over a channel (42) between a first transceiver (45) and a remote transceiver (43), said channel (42) having a bandwidth of $1/T_c$ Hz and being divided into M subchannels, said system employing M subcarriers for transmission of blocks of M symbols, each taken from a symbol constellation over said M subchannels, whereby the transmission over the i-th subchannel, with i=0, . . . , M−1, takes place at a modulation rate of $1/(m_i T_c)$ symbols/s, the i-th subchannel has a bandwidth of $1/(m_i T_c)$ Hz, where the numbers $m_i$ satisfy the condition $$\sum_{i=0}^{M-1} \frac{1}{m_i} = 1$$

at least one subchannel of said M subchannels has spectral nulls at the bandedges, and at least one subchannel of said M subchannels has zero guard bands.

24. The digital communications system according to claim 23, wherein subchannels are allocated for downstream transmission from said first transceiver to said remote transceiver and subchannels are allocated for upstream transmission from said remote transceiver to said first transceiver.

25. The digital communications system according to claim 23, wherein said first transceiver is part of a central office system and/or said remote transceiver is part of a subscriber or end-user system.

26. The digital communications system according to claim 23, comprising means for allocation of said subchannels.

27. The digital communications system according to claim 26, wherein said means for allocation of said subchannels comprise frequency-division duplexers.

28. The digital communications system according to claim 27, wherein said frequency-division duplexers are employed for allocation of transmission bandwidth to said upstream subchannels and downstream subchannels.

29. The digital communications system according to claim 27, wherein said frequency-division duplexers employ the zipper technique.

30. The digital communications system according to claim 23, wherein said channel is used for full-duplex transmission over any portion of the bandwidth $1/T_c$ Hz.

31. The digital communications system according to claim 30, wherein the entire bandwidth of $1/T_c$ Hz is employed for said full-duplex transmission.

32. The digital communications system according to claim 23 comprising means for per-subchannel echo cancellation.

33. The digital communications system according to claim 23, where said symbol constellations is a QAM (quadrature-amplitude modulation) constellation.

34. The digital communications system according to claim 33, where there are M QAM (quadrature-amplitude modulation) constellations which are not identical.

35. The digital communications system according to claim 23 wherein any portion of the available bandwidth of said channel can be allocated to upstream and to downstream transmission.

36. The digital communications system according to claim 35, comprising means for allocation of said available bandwidth such that there are overlapping frequency bands for upstream and downstream transmission.

37. The digital communications system according to claim 23 wherein said channel is a metallic telephone cable.

38. The digital communications system according to claim 37 being a digital subscriber line (DSL) system or a very-high-rate subscriber line (VDSL) system.

39. The digital communications system according to claim 23, wherein said remote transceiver comprises a transmitter with filtering means which are realized by the cascade of an inverse discrete Fourier transform (IDFT) unit, followed by an M-branch filter bank network where filtering means on the i-th branch are given by the i-th polyphase component of a prototype filter, and wherein said remote transceiver further comprises a parallel-to-serial converter yielding a signal transmitted over said channel at the rate of M/T samples/s.

40. The digital communications system according to claim 23, wherein said remote transceiver comprises a receiver with filtering means which are realized by the cascade of a serial-to-parallel converter yielding M signals in parallel at the rate of 1/T samples/s, and wherein said remote transceiver further comprises an M-branch filter bank network where a filter on the i-th branch is given by the i-th polyphase component of a prototype filter, and a discrete Fourier transform (DFT) unit.

41. The digital communications system according to claim 23, wherein decision-feedback equalizers, linear equalizers or Viterbi detectors, are employed for per-subchannel equalization.

42. The digital communications system according to claim 41, wherein the feedback section of said decision-feedback equalizer is implemented as a precoder in a transceiver's transmitter.

43. The digital communications system according to claim 23, wherein time-domain filters are employed for adjustment of phase characteristic of said channel.

44. The digital communications system according to claim 23, wherein means for oversampling of subchannel output signals are employed to allow interpolation/equalization of said subchannel output signals prior to symbol detection.

* * * * *